UNITED STATES PATENT OFFICE.

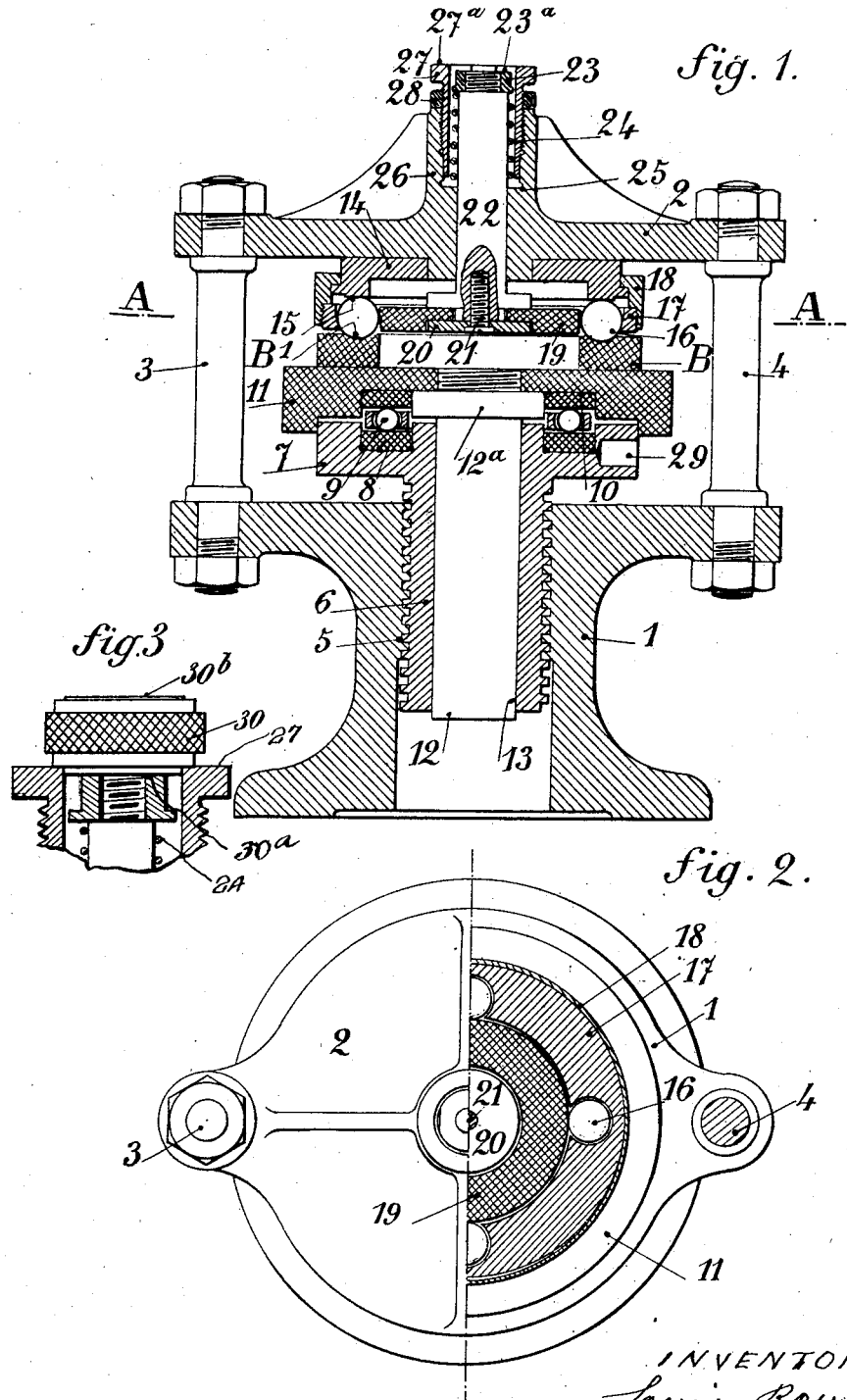

LOUIS ROUANET, OF IVRY PORT, FRANCE, ASSIGNOR TO COMPAGNIE D'APPLICATIONS MECANIQUES, OF PARIS, FRANCE.

GAGING APPARATUS FOR THRUST-BEARING RINGS.

1,391,509.         Specification of Letters Patent.   Patented Sept. 20, 1921.

Application filed December 17, 1919. Serial No. 345,516.

*To all whom it may concern:*

Be it known that I, LOUIS ROUANET, citizen of the Republic of France, residing at 42 Rue Franklin, Ivry Port, Seine, in the Republic of France, have invented new and useful Improvements in Gaging Apparatus for Thrust-Bearing Rings, of which the following is a specification.

This invention relates to an apparatus for verifying the axial diameter of the raceways in the rings of ball or roller bearings.

One object of the invention is to provide an apparatus of the above kind comprising a stand or base upon which the ring to be gaged is placed and an easily removable part which carries a gaging device corresponding to a certain dimension of rings to be inspected, whereby the verifying device may be easily replaced by another when it is desired to inspect rings of another dimension.

The invention comprises also a verifying apparatus in which the gaging device is provided with a contacting or thrust surface and in which balls or similar tactile bodies are freely supported in a support forming a part of the gaging device, the stand comprising a device for locking or clamping the balls, when they are centered in the raceway of the ring to be inspected, between said ring and the said thrust surface.

The invention comprises also other features which will more fully appear from the following description.

In the annexed drawings, given by way of example:

Figure 1 is a vertical section of a verifying apparatus constructed in accordance with the invention.

Fig. 2 is a plan view with a half section along the line A—A, Fig. 1.

Fig. 3 is a detail view of the controlling block.

As shown in the drawings, the apparatus comprises a base or stand 1 upon which an upper plate 2 is rigidly and removably connected by means of uprights 3 and 4 and bolts. The base 1 is provided with a central screw-threaded bore 5 in which is screwed a hollow rod 6 provided at its upper end with an enlargement or plate-holder 7 in which a circular slot 8 is formed for receiving one of the rings of a ball thrust bearing 9, the other ring of which is arranged in a recess 10 formed in a plate 11. By means of this arrangement, the plate 11 may easily be rotated during the verifying operation with respect to the plate-holder 7. The upper face of the plate 11 is carefully ground and planed for the purpose of receiving the ring B to be inspected, the apparatus being used for gaging the axial diameter D of the annular raceway $B^1$ in said ring. The plate 11 carries a depending central rod 12 which is guided in a bore 13 in the rod 6. An enlargement $12^a$ on the rod 12 bears against the bottom of the recess 10.

The devices for verifying bearing rings such as B are removably secured on the upper plate 2, the dimensions of said devices being suitably selected with respect to the dimensions of the rings to be inspected. Said verifying devices comprise a plate 14 the under face, 15, of which is ground and acts as a thrust or contacting surface for balls or similar tactile bodies 16 which are freely supported in a cage 17 screwed in a supporting ring 18 carried on a shoulder on the plate 14. The plate 14 is secured by any desired means to the upper plate 2 of the apparatus.

The gaging operation is effected by means of a conical member 19 which is pressed downwardly by means of a controlling block 30 (Fig. 3) into the circular space between the balls or tactile bodies 16. The cone 19 is secured by means of a washer 20 and a screw 21 to the lower end of a rod 22 which is screw threaded at its upper end for receiving a movable contact ring 23, the upper face $23^a$ of which is carefully ground. The cone 19 is constantly urged upwardly by a coil spring 24 bearing upon the bottom 25 of a central boss 26 provided on the upper plate 2. By means of this arrangement, a more satisfactory centering of the balls 16 in the raceway $B^1$ of the ring B is obtained. The boss 26 is internally screw-threaded for receiving the stationary contact ring 27 which may be adjusted in the proper position and held by means of a nut 28. The upper face $27^a$ of the ring 27 is also carefully ground.

The controlling block 30 may be provided on its opposite faces with circular projections $30^a$, $30^b$ (Fig. 3) the heights of which are respectively determined by the maximum and minimum predetermined values of the axial diameter of the raceway of the rings to be inspected. The projections 30ª, 30ᵇ have such a diameter that they may enter the bore of the outer ring 27.

The apparatus is used as follows: The thrust bearing ring B to be inspected is placed on the plate 11 which is then raised by means of the plate-holder 7, which latter may be rotated for instance by means of a spindle engaged into one of the holes 29 provided in the periphery of said plate-holder. The plate 11 is raised until the balls 16 which automatically center themselves in the raceway B¹, are locked or clamped between the wall of said raceway and the thrust or contact surface 15 on the plate 14. For facilitating the centering of the balls in said raceways, the plate 11 may be at the same time rotated upon the plate-holder 7, the plate 11 being provided with holes in its periphery or otherwise constructed so that it may be rotated easily. The controlling block 30 is then placed successively by its two opposite faces on the end surfaces 23ª and 27ª of the contact rings 23 and 27. When the projection, 30ª for instance, corresponding to the maximum diameter allowed is engaged into the ring 27, the annular surface on the block 30 around the projection 30ª should not come into contact with the ring 27 and the controlling block should be able to tilt slightly, which is easily felt with the hand. On the other hand, when the projection 30ᵇ corresponding to the minimum diameter is engaged into the ring 27, the controlling block 30 should rest by its outer annular part upon said ring 27, no tilting taking place. It will be noted that when the controlling block is placed in working position, the cone 19 is forced downwardly against the action of the spring 24 and the cone is returned upwardly by the spring as the controlling block is removed.

The apparatus may be adjusted by means of a gage ring before inspecting a series of corresponding rings.

When the opposite faces of the rings to be inspected are ground, the tactile bodies are preferably formed, according to the invention, by balls having a radius slightly greater than that of the raceway in the ring. By these means, the balls bear upon the circular edges of the raceway and the verification is more precise.

Having now described my invention, what I claim as new and desire to secure by Letters Patent is:

1. An apparatus for gaging the axial diameter of the raceways of thrust ball or roller bearings comprising in combination a stand upon which the ring to be inspected is adapted to be placed, a support adapted to be removably secured to the stand, a thrust member having a contacting surface secured on said support, tactile bodies, means for freely supporting said tactile bodies, means on the stand adapted to force the ring to be inspected toward the said thrust member whereby the tactile bodies are pressed between the wall of the ring raceway and the said contacting surface, a conical member secured to said thrust member and adapted to be pressed axially into contact with the tactile bodies, and means on the support for gaging the axial movement of said conical member.

2. An apparatus for gaging the axial diameter of the raceways of thrust ball or roller bearings comprising in combination: a stand, a plate rotatably mounted on said stand and upon which the ring to be inspected is adapted to be placed, a support adapted to be removably secured to the stand, a thrust member having a contacting surface secured on said support, tactile bodies, means for freely supporting said tactile bodies, means for adjustably securing said means to said support means on the stand adapted to force the ring to be inspected toward the said thrust member whereby the tactile bodies are pressed between the wall of the ring raceway and the said contacting surface, a conical member secured to said thrust member and adapted to be pressed axially into contact with the tactile bodies and means on the support for gaging the axial movement of said conical member.

3. An apparatus for gaging the axial diameter of the raceways of thrust ball or roller bearings comprising in combination, a stand, a plate holder having a screw connection with said stand, a ball bearing on said plate holder, a plate on said ball bearing upon which the ring to be inspected is adapted to be placed, a support adapted to be removably secured to the stand, a thrust member having a contacting surface secured on said support, tactile bodies adapted to engage into the raceway in the ring, means for freely supporting said tactile bodies, means for adjustably securing said means to said support a conical member secured to said thrust member and adapted to be pressed axially into contact with the tactile bodies and means on the support for gaging the axial movement of said conical member.

4. An apparatus for gaging the axial diameter of the raceways of thrust ball or roller bearings comprising in combination a stand upon which the ring to be inspected is adapted to be placed, a support adapted to be removably secured to the stand, a thrust member having a contacting surface secured on said support, tactile bodies, means for freely supporting said tactile bodies, means for adjustably securing said means to said support means on the stand adapted to force the ring to be inspected toward the said thrust member whereby the tactile bodies are pressed between the wall of the ring raceway and the said contacting surface, a conical member secured to said thrust member and adapted to be pressed axially into contact with the tactile bodies, yielding means adapted to normally hold the conical member away from the tactile bodies and means for gaging the axial movement of the conical member.

5. An apparatus for gaging the axial diameter of the raceways of thrust ball or roller rings comprising in combination a stand upon which the ring to be controlled is adapted to be placed, a support adapted to be removably secured to the stand, a thrust member having a contacting surface, secured on said support, balls having a diameter greater than the cross sectional diameter of the raceway to be inspected and adapted to engage with said raceway, means for freely supporting said balls, means on the stand adapted to force the ring to be inspected toward the said thrust member, whereby the balls are pressed between the edges of the ring raceway on the one hand and the said contacting surface on the other hand, a conical member adapted to be pressed axially into contact with the balls and means on the support for gaging the axial movement of said conical member.

In testimony whereof I have signed my name to this specification.

LOUIS ROUANET.